United States Patent
Vasudevan et al.

(10) Patent No.: US 6,342,904 B1
(45) Date of Patent: Jan. 29, 2002

(54) CREATING A SLIDE PRESENTATION FROM FULL MOTION VIDEO

(75) Inventors: Vinod V. Vasudevan; Gurminder Singh; Manoranjan D. Jesudoss, all of Singapore (SG)

(73) Assignee: NewsTakes, Inc., Burlingame, CA (US)

( * ) Notice: Subject to any disclaimer, the term of this patent is extended or adjusted under 35 U.S.C. 154(b) by 0 days.

(21) Appl. No.: 09/215,004

(22) Filed: Dec. 17, 1998

(51) Int. Cl.$^7$ .................................................. G06F 3/00
(52) U.S. Cl. ...................... 345/723; 345/716; 345/730; 707/500.1
(58) Field of Search .............................. 345/328, 327, 345/302, 723, 716, 730; 358/448, 467; 707/500.1

(56) References Cited

U.S. PATENT DOCUMENTS

| | | | |
|---|---|---|---|
| 5,179,449 A | | 1/1993 | Doi ................................ 386/4 |
| 5,253,069 A | | 10/1993 | Zeyer .......................... 348/110 |
| 5,459,517 A | | 10/1995 | Kunitake et al. ....... 375/240.13 |
| 5,489,949 A | | 2/1996 | Jeong et al. ................. 348/699 |
| 5,521,841 A | | 5/1996 | Arman et al. ................ 345/328 |
| 5,537,528 A | | 7/1996 | Takahashi et al. ........... 707/512 |
| 5,606,655 A | | 2/1997 | Arman et al. ................ 345/440 |
| 5,635,982 A | | 6/1997 | Zhang et al. ................ 348/231 |
| 5,640,560 A | | 6/1997 | Smith .......................... 707/104 |
| 5,664,227 A | | 9/1997 | Mauldin et al. ............. 707/516 |
| 5,686,961 A | | 11/1997 | Gasztonyi et al. ........... 438/118 |
| 5,708,767 A | | 1/1998 | Yeo et al. .................... 345/440 |
| 5,760,767 A | * | 6/1998 | Shore et al. ................. 345/328 |
| 5,793,429 A | | 8/1998 | Kim et al. .............. 375/240.17 |
| 5,893,062 A | * | 4/1999 | Bhadkamkar et al. ....... 704/270 |
| 5,999,173 A | * | 12/1999 | Ubillos ........................ 345/328 |
| 6,141,001 A | * | 10/2000 | Baleh .......................... 345/302 |
| 6,154,771 A | * | 11/2000 | Rangan et al. ............... 709/217 |
| 6,172,675 B1 | * | 1/2001 | Ahmad et al. .............. 345/328 |

OTHER PUBLICATIONS

Bimbo et al. ("Analysis of Optical Flow Constraints", EEE Transactions on image processing, vol. 4, No. 4, Apr. 1995).*

Vinod V. V. ("Activity Based Video Shot Retrieval and Ranking", IEEE Pattern Recognition Proceedings, vol. 1, pp. 682–684, Aug. 1998).*

Vinod et al. ("Video Shot Analysis using efficient multiple object tracking.", IEEE Multimedia Computing and Systems Proceedings, vol. 1, pp. 501–508, Jun. 1997).*

Vinod V. V., et al. "Video Shot Analysis using Efficient Multiple Object Tracking." IEEE Computer Society Press (1997) USA.

Vinod V. V., et al. "Focused Color Intersection With Efficient Searching For Object Extraction." Pattern Recognition, vol. 30, No. 10 (1997) pp 1787–1797.

Vinod V. V., et al. "Activity Based Video Shot Retrieval and Ranking." IEEE Computer Society Press (1998) USA pp 682–684.

* cited by examiner

*Primary Examiner*—Raymond J. Bayerl
*Assistant Examiner*—Sy D. Luu
(74) *Attorney, Agent, or Firm*—Ladas & Parry

(57) ABSTRACT

A method and apparatus is disclosed for converting audio-video data from a full motion video format to a slide show presentation with synchronised sound. The full motion video is received from a source, separated into an audio stream and a video sequence, the video sequence is divided into a number of shorter video segments, key frames are extracted for each segment and a significance measure is calculated for each frame. A database is created wherein the extracted data is stored for subsequent (off-line) processing and reproduction. The system may have more than one system retrieving data from the database, selecting slide frames and subsequently displaying a slide presentation.

41 Claims, 7 Drawing Sheets

CREATING A SLIDE PRESENTATION FROM FULL MOTION VIDEO

FIELD OF THE INVENTION

The present invention relates to audio video processing and particularly to systems for converting full motion video into a slide show presentation with synchronised sound through the use of content based video reformatting.

BACKGROUND ART

Effective use of storage media and/or channel capacity has been the aim of many systems. Management of video data is particularly important because video requires a medium or channel with high capacity, typically many megabytes of data per minute. One way to reduce the medium or channel capacity is by converting a full motion video into a slide show presentation showing salient visuals with corresponding audio rather than full motion video. Known arrangements for conversion of video to slides require manual selection of frames from the video and consequential compiling of a slide presentation. This is a very labor intensive task and therefore impractical to perform on a large scale.

A video is also a pre-packaged presentation which has a fixed pace. This fixed pace is a limitation and is particularly problematic when videos are used in the education context. This is because it assumes that the absorption rate of each member of the target audience is the same. A slide presentation, on the other hand, provides a higher level of inter activity in the sense that the user has the option to view any one slide for a longer or shorter time period, as required. A further advantage of a slide show presentation is that it can easily be augmented with supplementary information, thereby adding further value to the content.

More recently, image-processing techniques have been developed to operate on digital video in order to facilitate the previously manual task of selecting certain frames from a video and compiling a slide presentation. One technique used in such systems is to extract and display only key frames or R-frames from a video. Key frames are frames denoting important events which can serve as an abstract of a video sequence. R-frames are frames representative of a group of frames in a video sequence.

However, such a technique results in from that are considered too closely paced in time and hence do not result in a smooth slide presentation. Further, such an arrangement does not satisfy the channel capacity requirement, because it does not take into account the information content of a frame relative to that directly preceding it and therefore includes redundant frames. For instance, when a scene is relatively static for a couple of moments, this technique would send (or store) successive frames containing little to no further information.

SUMMARY OF THE PRESENT INVENTION

It is an object of the present invention to substantially overcome, or at least ameliorate, one or more of the deficiencies of the above mentioned arrangements.

In accordance with one aspect of the present invention there is provided a method for converting full motion video into a slide show with synchronised audio, said method comprising he steps of:

(a) receiving audio-video data;

(b) separating said audio-video data into an audio stream and a video sequence;

(c) dividing said video sequence into video, each of said video segments comprising a group of frames;

(d) for each said video segment (d1) extracting at least one representative frame from the corresponding said group of frames;

(d2) calculating a significance measure using said frames;

(d3) using said significance measure, selecting at least one slide frame from said group of frames;

(e) synchronising said audio stream and said slide frames; and (f) synchronously reproducing said slide frames and said audio stream.

In accordance with another aspect of the present invention there is provided a method for creating a database for use in converting full motion video into a slide show with synchronised audio, said method comprising the steps of:

(a) receiving audio-video data;

(b) separating said audio-video data into an audio stream and a video sequence;

(c) dividing said video sequence into video, each of said video segments comprising a group of frames;

(d) for each said video segment (d1) extracting at least one repretative frame from the corresponding said group of frames;

(d2) calculating a significance measure using said frames; and (e) storing at least an identifier to each of said segments, said significance measures and an identifier to said audio stream.

In accordance with yet another aspect of the present invention there is provided a method for displaying a slide show with synchronised audio, said method comprising the steps of:

(f) retrieving at least an identifier to each of a plurality of video segments, significance measures and an identifier to an audio stream, wherein each of said video segments comprising a group of frames;

(g) for each said video segment, using said significance measures, selecting at least one slide frame from said group of frames;

(h) synchronising said audio stream and said slide frames; and (i) synchronously reproducing said slide frames and said audio stream.

In accordance with yet another aspect of the present invention there is provided apparatus for creating a database for use in converting full motion video into a slide show with synchronised audio, said apparatus comprising:

input means for receiving audio-video data;

audio extraction means for separating said audio-video data into an audio stream and a video sequence;

video dividing means for dividing said video sequence into video segments, each said video segment comprising a group of frames;

key frame extraction means for extracting, for each said video segment, at least one representative frame from the corresponding group of frames of each of said video segments;

significance calculation means for calculating significance measure using said frames;

database storage means for storing said database, the database including at least an identifier to each of said segments, said significance measures and an identifier to said audio stream.

In accordance with yet another aspect of the present invention there is provided apparatus for presenting a slide show with synchronised audio, said apparatus comprising:

presentation retrieval means for retrieving a audio stream and slide frames from said storage means; and output means for synchronously reproducing said slide frames and said audio stream.

In accordance with yet another aspect of the present invention there is provided a computer program product including a computer readable medium incorporating a computer program for creating a database for use in converting full motion video into a slide show with synchronised audio, said computer program product comprising:

input means for receiving audio-video data;

audio extraction means for separating said audio-video data into an audio stream and a video sequence;

video dividing means for dividing said video sequence into video segments, each said video segment comprising a group of frames;

key frame extraction means for extracting, for each said video segment, at least one representative frame from the corresponding group of frames of each of said video segments;

significance calculation means for calculating significance measures using said frames;

database storage means for storing sad database, the database including at least an identifier to each of said segments, said significance measures and an identifier to said audio stream.

In accordance with yet another aspect of the present invention there is provided a computer program product including a computer readable medium incorporating a computer program for displaying a slide show with synchronised audio, said computer program product comprising:

database retrieval means for retrieving a database, the database including at least an identifier to each of a plurality of video segments, significance measures and an identifier to an audio stream, wherein each of said video segments comprising a group of frames;

selection means for selecting, for each of said video segments, at least one slide frame from said group of frames using said significance measures; and synchronisation means for synchronising said audio stream and said slide frames; and output means for synchronously reproducing said slide frames and said audio stream.

In accordance with yet another aspect of the present invention there is provided a computer program product including a computer readable medium incorporating a computer program for converting full motion video into a slide show with synchronised audio, said computer program product comprising:

means for receiving audio-video data, means for separating said audio-video data into an audio stream and a video sequence;

means for dividing said video sequence into video, each of said video segments comprising a group of frames;

means for processing each said video segment by
(1) extracting at least one representative frame from the corresponding said group of frames;
(2) calculating a significance measure us said frames;
(3) using said significance measure, selecting at least one slide frame from said group of frames;

means for synchronising said audio stream and said slide frames; and means for synchronously reproducing said slide frames and said audio stream.

In accordance with yet another aspect of the present invention there is provided a computer program product including a computer rile medium incorporating a computer program for creating a database for use in converting full motion video into a slide show with synchronised audio, said computer program product comprising:

means for receiving audio-video data;

means for separating said audio-video data into an audio stream and a video sequence;

means for dividing said video sequence into video, each of said video segments comprising a group of frames;

means for processing each said video segment by
(1) extracting at least one representative frame from the corresponding said group of frames;
(2) calculating a significance measure using said frames; and means for storing at least an identifier to each of said segments, said significance measure and an identifier to said audio stream.

In accordance with yet another aspect of the present invention there is provided a computer program product including a computer readable medium incorporating a computer program for displaying a slide show with synchronised audio, said computer program product comprising:

means for retrieving at least an identifier to each of a plurality of video segments, significance measures and an identifier to an audio stream, wherein each of said video segments comprising a group of frames;

means for processing each said video segment, using said significance measures, selecting at least one slide frame from said group of frames;

means for synchronising said audio stream and said slide frames; and means for synchronously reproducing said slide frames and said audio stream.

BRIEF DESCRIPTION OF THE DRAWINGS

A preferred embodiment of the present invention is described hereinafter with reference to the drawings and appendicies, in which.

DETAILED DESCRIPTION

Figure 1:
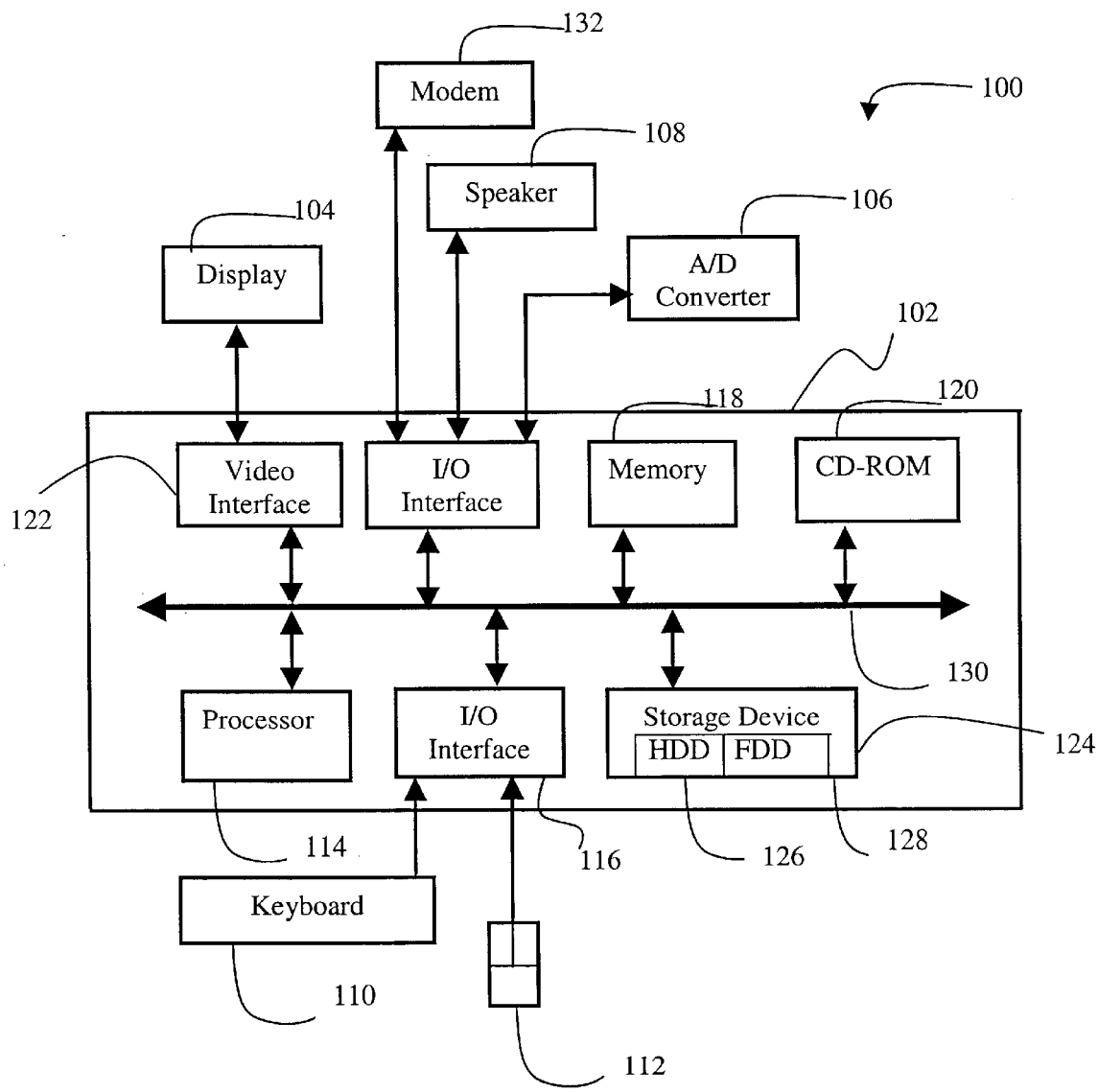
FIG. 1 is a schematic block diagram of a general-purpose computer upon which the preferred embodiment of the present invention can be practiced.

Where reference is made in any one or more of the drawings to steps and/or features, which have the same reference numerals, those steps and/or features are for the purpose of the description the same, unless the contrary appears.

Figure 6:
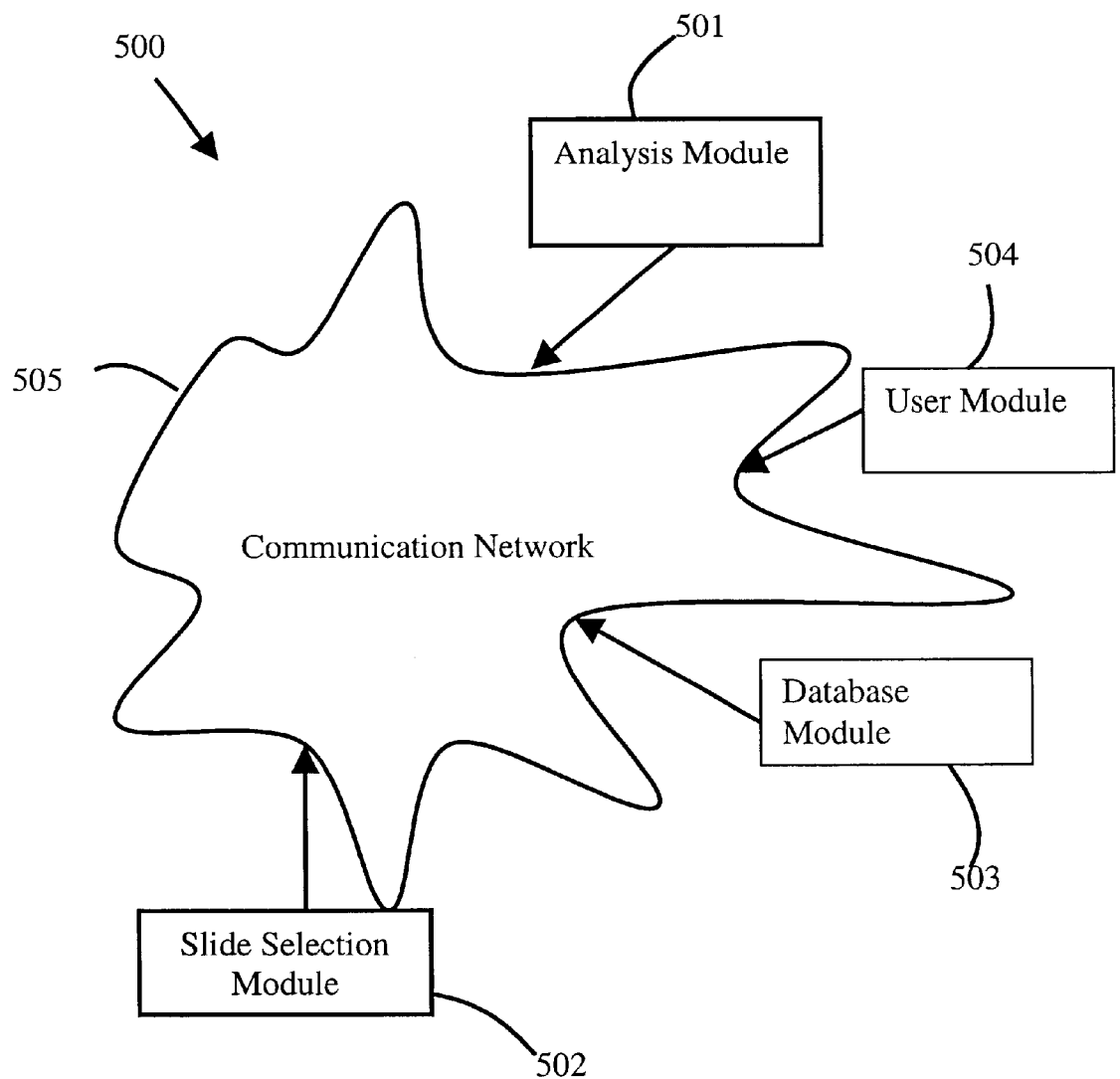
FIG. 6 is a diagram illustrating an distributed modular system according to a further embodiment of the present invention.

The preferred embodiment of the present invention can be implemented as a computer application program using a conventional general-purpose computer system, such as the computer system 100 shown in FIG. 1, wherein the application program to be described with reference to the other drawings is implemented as software executed on the computer system 100. The computer system 100 includes a computer module 102, input devices such as a keyboard 110 and mouse 112, and output devices including a audio speaker 108 and a display device 104. An Analog-to-Digital (A/D) Converter device 106 is used by the computer module 102 for inputting data from an analog source (not illustrated), for example when data is sourced from a video tape recorder. A Modulator-Demodulator (Modem) transceiver device 132 is used by the computer module 102 for communicating to and from a communications network generally depicted in FIG. 6, for example connectable via a telephone line or other functional medium. The modem 132 can be used to obtain access the Internet and other network systems, which allows the functionality of embodiments of the invention to be practiced in a distributed system.

The computer module 102 typically includes at lest one processor unit 114, a memory unit 118, for example formed from semiconductor random access memory (RAM) and read only memory (ROM). A number of input/output (I/O) interfaces including a video interface 122, and an I/O Interface 116 for the keyboard 110 and mouse 112 are also included. A storage device 124 is provided and typically includes a hard disk drive 126 and a floppy disk drive 128. A CD-ROM drive 120 is typically provided as a non-volatile source of data, such as audio-visual data. The components 114 to 128 of the computer module 102, typically communicate via an interconnected bus 130 and in a manner which results in a conventional mode of operation of the computer system 100 known to those in the relevant art. Examples of computers on which the embodiments can be practised include IBM-PC's and compatibles, or alike computer systems evolved therefrom. Typically, the application program of the preferred embodiment is resident on the hard disk drive 126 and read and executed using the processor 114. Intermediate storage of the program and any data processed may be accomplished using the semiconductor memory 118, possibly in concert with the hard disk drive 126. In some instances, the application program may be supplied to the user encoded on a CD-ROM or floppy disk, or via a computer network such as the Internet.

Audio-video data is input into the computer module 102 through one or more of the input devices such as the CD-ROM drive 120 or the Analog-to-Digital (A/D) Converter device 106. The processor unit 114 performs calculations and conversions to the audio-video data, in accordance win instructions contained in die software.

The audio-video data is converted from a full motion video format, encoded for example using the MPEG standard, by the processor unit 114, to a combination of frames and audio stream. A database containing pointers to segments of the video and other extracted frames parameters is tend created and stored on the storage device 124 or at other locations. Alternatively, this database may be transferred and/or made available over the network via the modem device 132 for example. The database is available for retrieval later by the same system 100 or any like system 100 connected to the network that is capable of carrying out the functionality. Still further, the embodiments of the invention may be practiced as a distributed system over an electronic network, of which the computer is just one component. This is described in greater detail hereinafter with reference to FIG. 6. From the database, slide frames are selected and the audio stream and the slide frames are synchronised by the processor unit 114 before the computer module 102 provides an output to an audience through displaying the slide frames on the display device 104 and playing the audio stream on the audio speaker 108.

Additionally, a user is provided with a rate controller, preferably implemented in software operating on the computer system 100 and controllable using the keyboard 110 and/or the mouse 112, that allows the user to increase or decrease the rate of the slide show presentation in an analog fashion, and particularly the rate at which the slide frames are changed. Whenever the rate is changed by the user through the rate controller, the processor unit 114 re-selects the slide frames and re-synchronises the audio stream and video frames prior to continuation of the output through the audio speakers 108 and the display device 104.

Figure 2A:
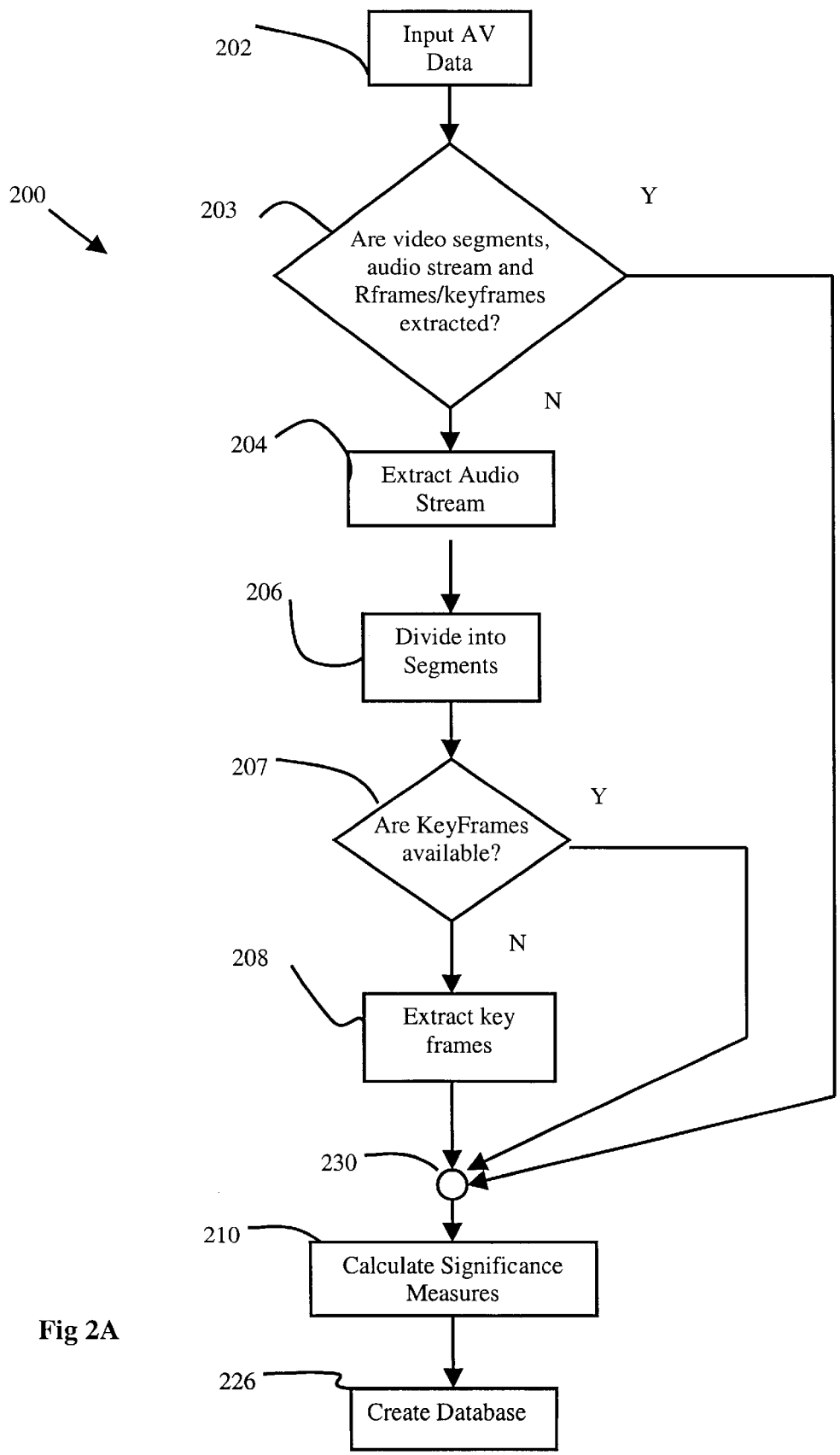
FIG. 2A is a simplified flow diagram of a method for converting from full motion video to a slide show database according to another embodiment of the present invention.
Figure 2B:
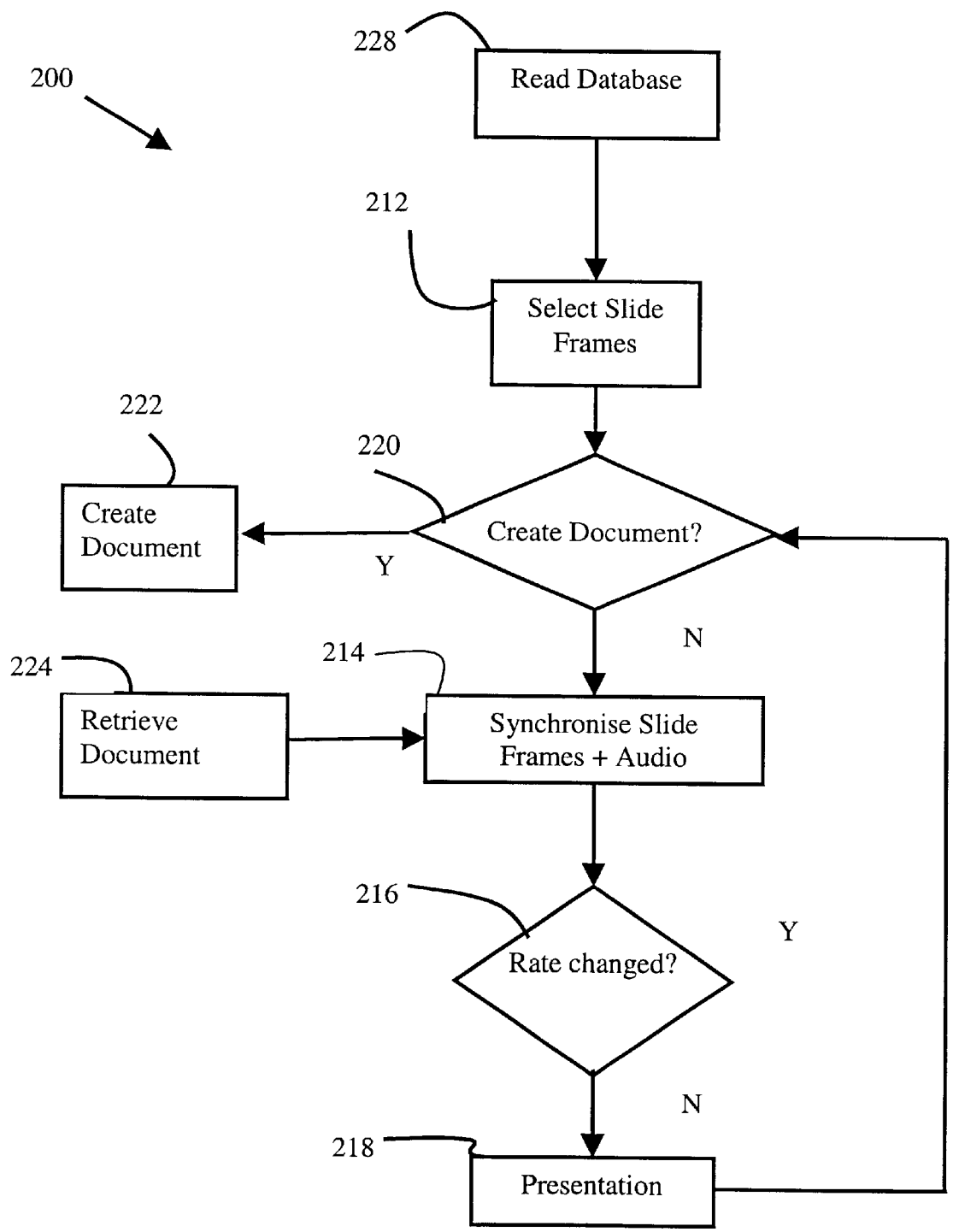
FIG. 2B is a simplified flow diagram of a method for converting the slide show database into a slide show; according to one embodiment of the present invention.
Figure 3A:
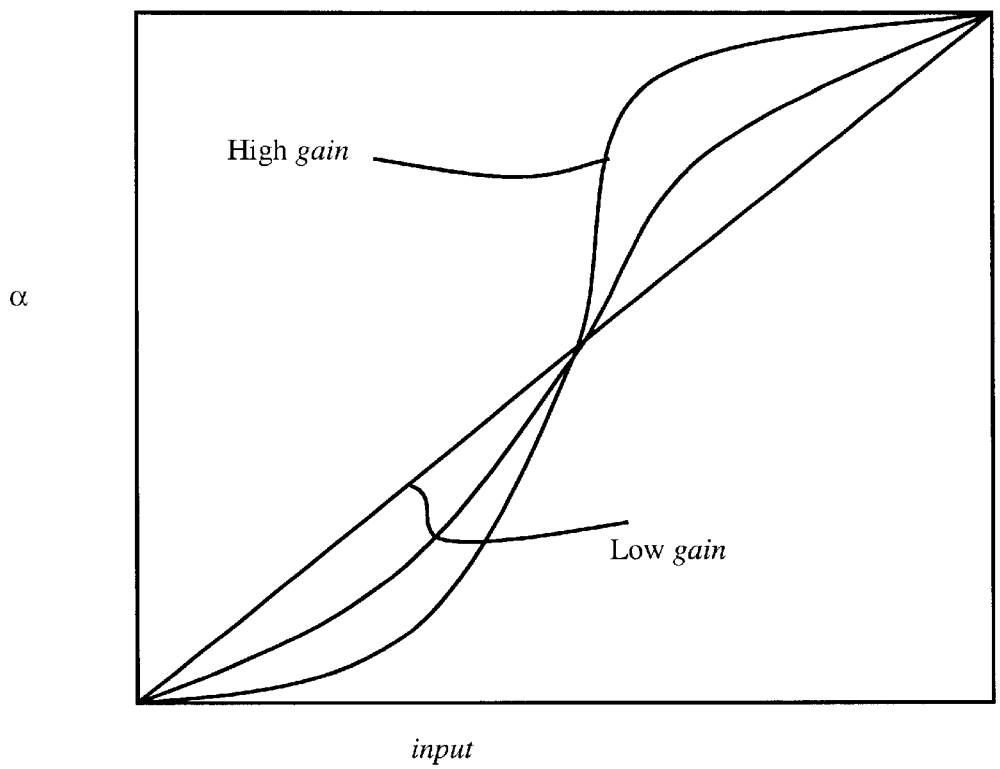
FIGS. 3A and 3B are monotonically increasing functions, selectable by the user to determine frequency of slide changes.
Figure 3B:
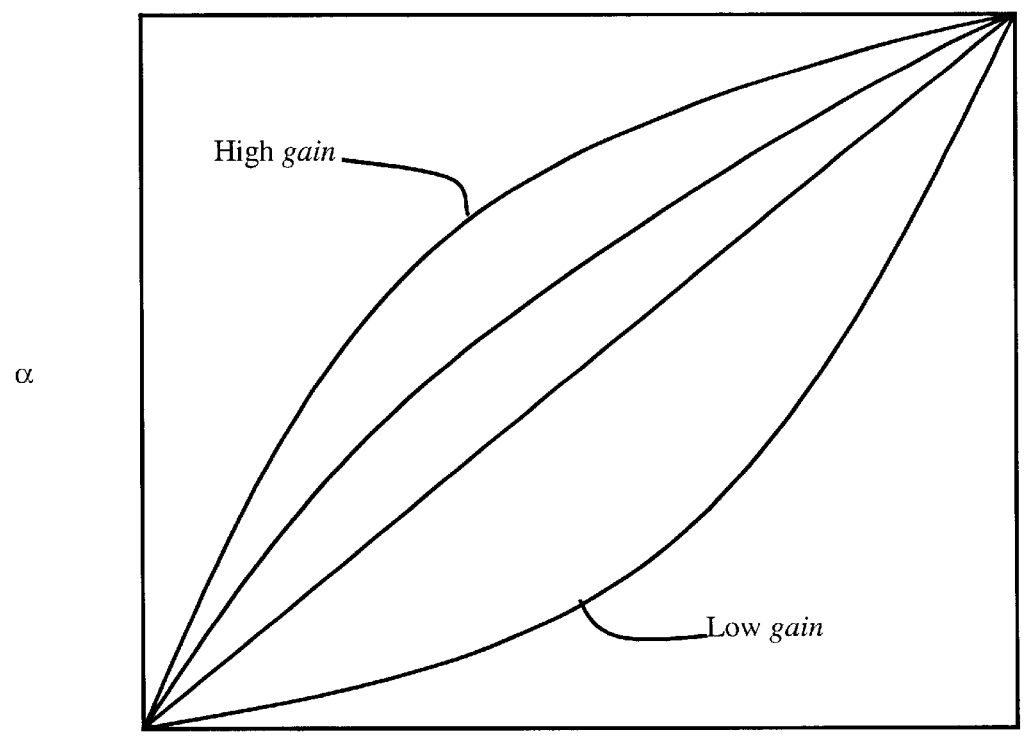

FIGS. 2A and 2B show flow diagrams of a method 200 for convert audio-video data from a full motion video format to a slide show presentation with synchronised sound, according to an embodiment of the present invention. The method 200 is divisible into two distinct stages, shown in FIG. 2A and 2B respectively, where the stages may be operated with the latter immediately and transparently following the other with no discernible break in operation, or separately and consecutively in an off-line fashion.

Referring to FIG. 2A, the method 200 commences at step 202 wherein the full motion video containing audio-visual (AV) content 48 is received from a source in a digital format, for example using the MPEG standard. Alternatively, should the video still be in an analog format, for example when sourced from a video tape recording, the input step 202 should be preceded by an analog to digital conversion step (not illustrated).

Figure 7:
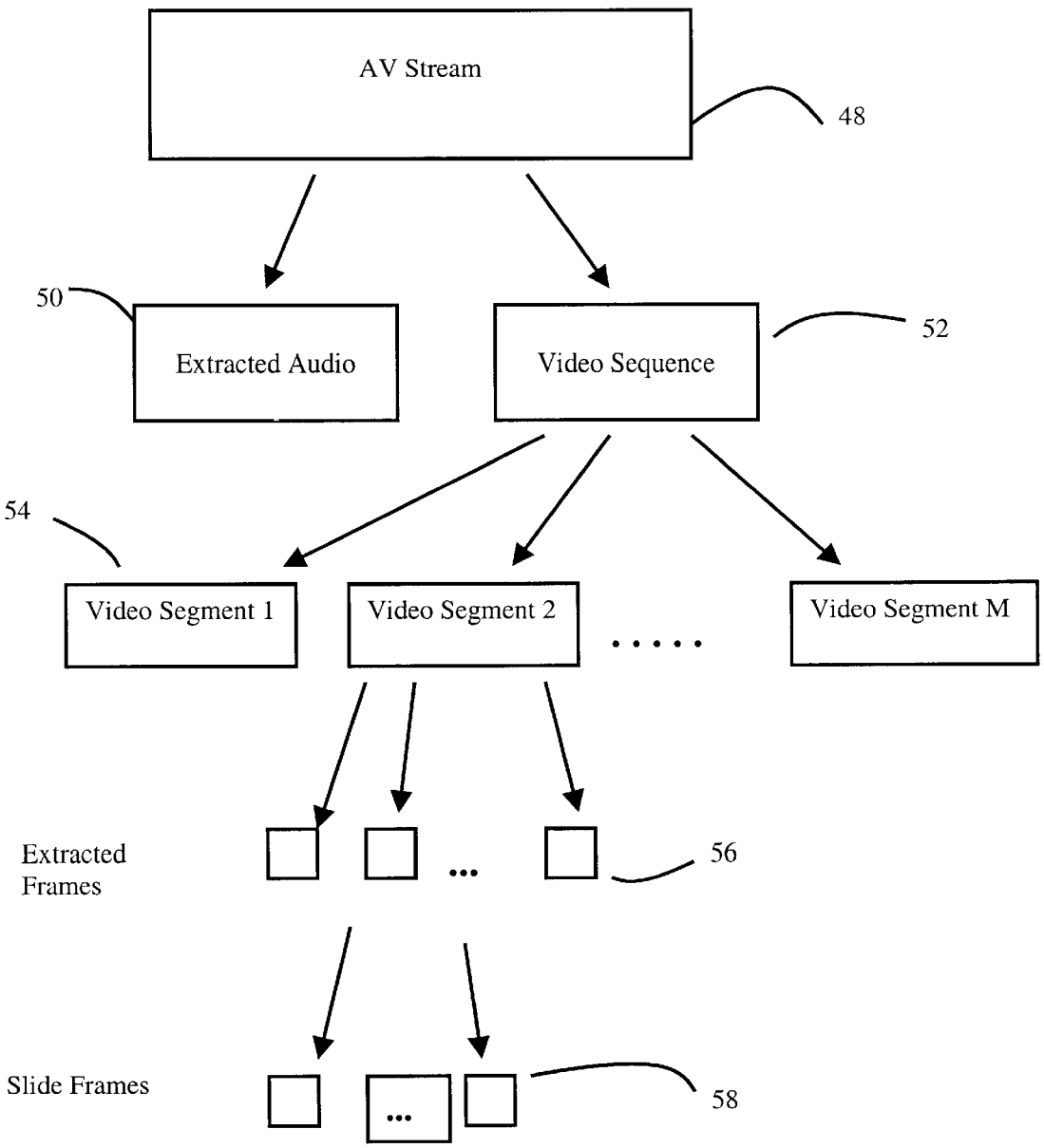
FIG. 7 depicts generally audio-visual data division used in the embodiments.

Referring to FIG. 7, the breakdown of the audio-visual content 48 of the video stream used in the various embodiments is illustrated, and which includes extracted audio 50, the corresponding video sequence 52, a number of video segments 54 derived therefrom, one or more frames 56 (termed herein as "key frames") extracted from each video segment 54, and one or more slide frames 58 determined from the extracted frames 56. In practice, a video segment 54 is a single, uninterrupted camera shot, typically including a number of frames.

Returning to FIG. 2A, step 203 performs a determination of whether the digital input format from step 202 already contains extracted audio 50, a video sequence 52 divided into video segments 54 and key frames 56. If the format contains these elements, control is passed through node 230 to step 210 where significance measures are directly calculated.

Alternatively, the audio-video data 48 is separated in step 204 into the audio stream 50 and the video sequence 52. No further processing, other than its retrieval on for reproduction (to be described) is performed on the audio stream 50.

The video sequence 52 is further processed in a dividing stop 206 wherein the video sequence 52 is divided into a number of shorter video segments 54, each having a number of frames, by detecting scene changes in the video sequence 52. A scene change can be detected as a sharp break between two frames or as a gradual transition occurring across a number of frames between one segment 54 to the next in the form of fade-in and fade-out, and other special effect. In video, a logical point to partition the video sequence 52 into segments 54 is where the contents, a by measuring certain characteristics of a video frame, change more than a predetermined threshold from one frame to the next. The frame characteristics may include the luminance of the frame. Other characteristics may include color tone or density. When the difference between consecutive frames exceeds a predetermined threshold level, a segment boundary may be deemed to have been detected.

A number of methods for detecting segment boundaries and thus to divide the video sequence 52 into segments 54, are described in U.S. Pat. No. 5,635,982, the disclosure of which is hereby incorporated by cross-reference. That document describes a specific method wherein both video 52 with sharp breaks and gradual transitions between video segments 54 can be detected. Further, alternative methods can be found in U.S. Pat. Nos. 5,606,655 and 5,179,449, the disclosure of each of which is hereby incorporated by cross-reference.

Once the video sequence 52 is divided into segments 54 in step 206, a determination is made in step 207 whether the format already contains key frames. If the format contains these elements, control is passed through node 230 to step 210 where significance measures are calculated. Alternatively, key frames 56 are extracted for each segment 54 in step 208 by analysing the variation of the video content of each frame of the segment 54 to that of the preceding selected key frame 56. Once a set of preselected thresholds are exceeded, the next key frame 56 is determined. Key frames 56 are thus frames that denote important events which can serve as an abstract of a video segment 54. One method for extracting key frames 56 is now described. Key frames, by definition, are based on the semantics of a shot and identification strategies are domain dependent. However, certain generic events may be identified by observing interesting objects, without an in-depth understanding of the semantics. While such frames will not constitute a complete set of key frames, it will be a useful partial set which may be manually augmented.

The relative positions of objects present a very strong and useful cue for identifying certain events. Some activities involving two objects are possible only if they are at the same or near position. These may be easily identified from the tracked positions. All frames are identified in which the distance between two objects is less than a given threshold. In general, these frames will consist of a number of continuous sequences. Each sequence denotes a different point in time when the objects come close to each other. The number of sequences is the number of times the objects come close to each other. From each sequence the frame in which the objects are closest to each other is selected as a candidate key frame 56.

The change in visibility of an object denotes a second type of event in the shot. The frames in which an object is absent in the scene and those in which it is present are available in the tracking results. From the tracking results the frames at which each object disappears from view and the frame in which it again appears (if it appears again) is detected. The first appearance and the last disappearance can be selected as key frames 56. The other frames are grouped together to disappearance-appearance pairs. Let $f_d$ denote the frame where the object disappears and $f_a$ denote the frame where it is visible again. If $f_d$ and $f_a$ are very close, then it indicates a temporary occlusion and a single frame is selected as candidate key frame 56. If the frames are widely separated then both are treated as candidate key frames 56. That is, $$key\ frame = \begin{cases} f_d \text{ and } f_a \text{ if } |f_a - f_d| > \theta_o \\ \frac{(f_d + f_a)}{2} \text{ otherwise} \end{cases}$$

where $q_o$ is the minimum separation between the frames for selecting both the frames as candidates.

The change in the size of an object denotes either a camera zoom of the object moving towards/away form the camera. Frames which represent a major change in the size of an object compared to a previous key frame, can be identified from the approximate size provided by the tracking system. The relative change in size is important and not the absolute size of the object. Hence, it is sufficient to consider frames which have major difference in size as compared to candidate key frames 56 detected using nearest points and visibility changes. Each frame is selected in which the object's size is different by a factor of at least, $q_s$ from all the key frames 56 selected previously (using nearest point, visibility change or size change) as a candidate key frame 56.

The candidate key frames 56 selected based on nearest points, visibility changes and size changes do not take time into account. As a result, they may include frames which are very closely placed in time. Two nearby frames convey the same or very similar information. To avoid redundancy, a minimum temporal separation between the key frames has to be ensured. For this, the candidate key frames 56 are clustered with the constraint that the clutter centers are at least $\theta_o$ frames apart. The cluster centers are used as the final set of key frames.

The first and the last frames in the shot establish the boundaries of the shot and are useful key frames 56. These frames are added to the list of key frames 56 and are considered as fixed cluster centers. This ensures that the first and last frame are definitely included in the final list of key frames 56.

Further methods for extracting key frames 56 can be found in U.S. Pat. No. 5,606,655 and in U.S. Pat. No. 5,635,982. T, the disclosure of each of which is hereby incorporated by cross-reference. Where the audio-visual data is obtained which includes "representative frames", or "R-frames", for example from an MPEG source, such may be used as key frames in the described embodiments.

In step 210, a significance measure is calculated for for frames each frame, including the key frames 56 and the remaining frames, of each of the video segments 54.

Figure 4:
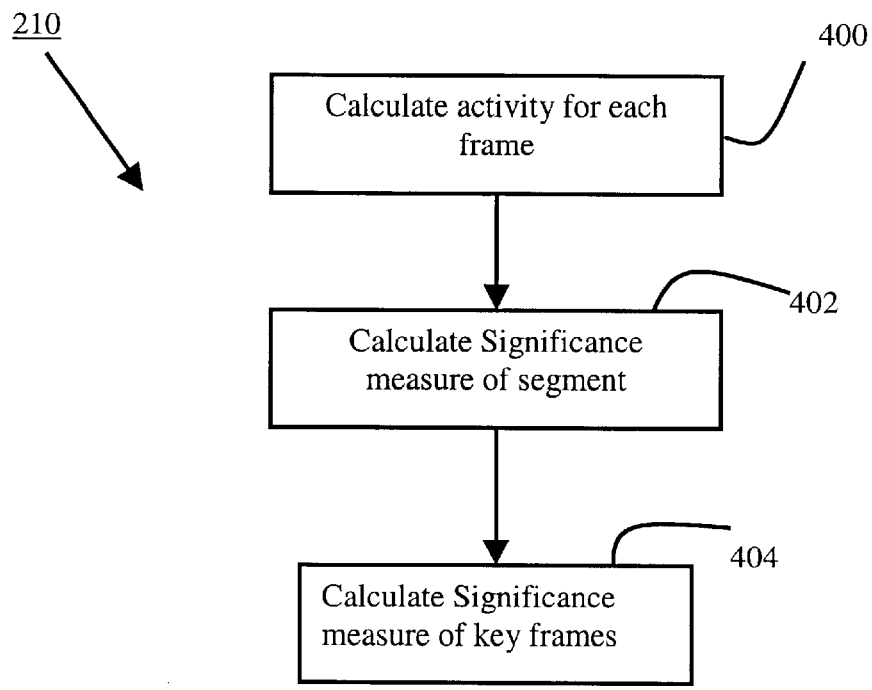
FIG. 4 is a flow diagram of a method for calculation of significance meat that may be used in embodiments of the present invention.
Figure 5:
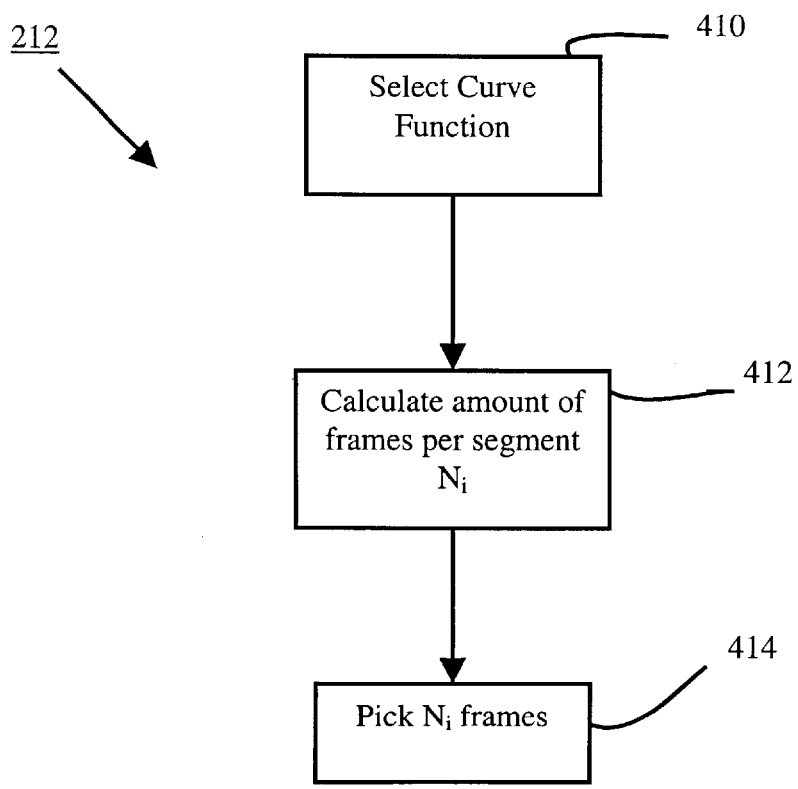
FIG. 5 is a flow diagram of a method for selecting the slide that may be used in embodiments of the present invention.

The significance measure determination is further described in FIG. 4, where step 210 is seen to commence with sub-step 400, wherein the activity of each frame is calculated. In order to do so, the direction and magnitude of motion $(u_i, v_i)$ for each object of each in the frames is calculated. This may be performed using any one of a number of known video motion detection arrangements. Where the audio-visual data source includes information regarding motion, that information may be used directly. One example of this occurs through the use object-based-coding, as in the MPEG-4 standard, whether objects, being components of individual images are directly available and motion detection may be performed for each object for each frame. One method for determining objects using focus regions is now described.

The following setting is considered for developing this method. "Given a set of models $M=(M_n)$, n=1, ..., N, where each $M_n$ is the color image of a know object and a scene § of X×Y pixels (i.e. §=$p_{xy}$, x=1, ..., X, y=1, ..., Y), identify any model objects present in the scene and extract eh regions occupied by them". The scene § may consist of zero or more known objects against a complex unknown background. The absolute as well as relative sizes of the objects may vary from scene to scene. There could be any amount of change in two-dimensional actuation and a small change in three-dimensional orientation of the objects. Objects may be partially occluded and the shape of an object may vary from scene to scene.

The following steps are involved in the described method of determining objects:

Extracting and Matching Focus Regions—Extracting the set of focus regions in a multiresolution structure and an efficiant algorithm for evaluating the color similarity between a focus region and a model.

Competitive Identification and Pruning—The process of competitively associating a focus region with a model and pruning the sets of competing focus region and models.

Active Search—Efficient object search method using upper bound putting for determining the best matching focus region.

Each of these steps is now described, followed by an algorithmic specification of the method for determining objects.

Extracting and Matching Focus Regions

The histogram of a scene containing multiple objects will, in general, have little or no similarity to a model histogram. In such situations, parts of the scene are considered for matching against the models. Such parts are referred to as focus regions. Ideally, the focus regions should contain a single object. However, this is difficult to ensure in the absence of a prior information regarding the object size, shape, etc. Since the objects may occur at different sizes and positions in different images, the focus regions should cover all sizes and positions. However, since the color distributions of a few pixels in the scene will not carry any effective information, regions with very few pixels should not be considered.

In the absence of a priori information favoring any particular shape for the focus regions, a regular shape such as a circle or square may be used. For the sake of conciseness, a square shape is considered and focus regions are extracted using a square window of size w×w pixels. Different focus regions are extracted by scanning the input image with the square window. For scanning the image the window is shifted by s pixels in one direction at a time. After one complete scan is over, the input image is scaled by a factor α where α<1. Focus regions are extracted from this resized image by scanning it with the same window as earlier. Larger regions from the original image are focused upon. This accommodates changes in object size. This process of resizing images by a factor α and scanning the input image is continued until the image becomes smaller than the scanning window. Thus, the focus regions are extracted by a process of resizing the input image by a factor α (i.e. image sizes 1, α, wα², ... ) and scanning each resized image with a fixed size square window. FIG. 8A shows this process. The hatched squares represent some of the focus regions in the images. The window size w and the shift s used for scanning the images are also shown in the figure. The set of focus regions may be characterized as follows. Let $§^k$ denote the image resized by $α^k$ and $p_{xy}^k$ denote the pixels belonging to $§^k$. Then $§^k = p_{xy}^k$, x=1, ..., $α^k$X, y=1, ..., $a^k$Y, where $$p_{xy}^k = p_{uv}, u = \left\lfloor \frac{x}{α^k} \right\rfloor, v = \left\lfloor \frac{y}{α^k} \right\rfloor$$

Let $R_{ijk}$ denote a focus region belonging to $§^k$. Then the set R of all focus regions considering all resized images is given by $$R = \{R^k_{ij}\}, \qquad (1)$$

where $$K = 0, \ldots, \min\left(\lfloor \log_α \frac{w}{X} \rfloor, \lceil \log_α \frac{w}{Y} \rceil\right)$$

$$i = 0, \ldots, \frac{α^k X - w}{s}, j = 0, \ldots, \frac{α^k Y = w}{s},$$

$R^k_{ij} = p_{xy}$, x=si+1, ..., si+w and y=sj+1, ..., sj+W.

The similarity S(R,M) between a focus region R and a model M is evaluated as the histogram intersection between these normalised color histograms. The normalised colour histogram is obtained by dividing each histogram count by the total number of pixels. That is, the sum of all counts in a normalised histogram will be 1.0. All references to histogram intersection herein means histogram intersection of normalised histograms. The histogram intersection between two histograms $h^M$ and $h^R$ each with b bins, is defined as:

$$\sum_{i=1}^{b} \min(h_i^R, h_i^M)$$

A straight forward computation of this measure, for a focus region and a model, involves constructing the normalised histogram of the focus region and then to compute its intersection with the precomputed normalised histogram of the model. This would require initialising the entire histogram and one scan over the focus region and at least one scan over the histogram (assuming that normalised histogram intersection can be computed by one scan over the non-normalised histogram). The resulting complexity is of order of max ($w^2$,b), where b is the number of bins in the histogram. However, since the focus region has only $w^2$ pixels, there will be at most $w^2$ relevant bins in the histogram. The other bins definitely have zero values and do not contribute to the histogram intersection. Based on this observation, as the following method is used for computing the normalised histogram intersection of focus region $R^k_{ij}$ and a model $M_n$.

The entire image is first converted to an internal representation by replacing the color value of each pixel by the index of the histogram bin to which that pixel is mapped. That is, each pixel $p_{xy}$ in the image has an integral value indexing the histogram counts. This operation takes similar (actually less) effort as histogramming the whole image and has to be done only once. The following algorithm computes the histogram intersection from this representation and the precomputed normalised histogram of the model without explicitly constructing the histogram of $R^k_{ij}$.

Algorithm Evaluate

1. Focus region $R^k_{ij}$. Model histogram $h^n$. Temporary histogram h.

2. Initialise count=0, $S(R^k_{ij},M_n)=0$.
3. For each pixel $p^k_{xy}$ of $R^k_{ij}$ do h $p^k_{xy}=0$ if $p^k_{xy}$ is not masked; count=count+1 if $p^k_{xy}$ is masked.
4. For each pixel $p^k_{xy}$ of $R^k_{ij}$ do: If $$(hp_{xy}^k < hp_{xy}^k)$$

then $$hp_{xy}^k = hp_{xy}^k + \frac{1}{count}, S(R_{ij}^k, M_n) = S(R_{ij}^k, M_n) + \frac{1}{count}$$

The above algorithm scans the focus region twice. In the first scan, in step 3, the temporary histogram is initialised. In the subsequent scan in, step 4, the histogram intersection is evaluated. The complexity is $O(w^2)$ and is independent of the number of histogram bins. Since complexity is independent of histogram size, the algorithm is also well suited for large histograms such as co-occurrence histograms.

Comparative Identification and Pruning

In the case of a perfect match between a model M and focus region R the histogram intersection value S(R,M) will be equal to 1.0. However, a perfect match is very unlikely, In general, even when R contains pixels not belonging to M, the intersection value will be less than 1.0. This may be the result of inter-reflections, changes in background, changes in environment conditions, etc. moreover in situations where R contains only a part of M, or where R contains pixels not belonging to M, the intersection value will be less than 1.0. At the same time very low values of S(R,M) may be caused due to partial similarity between models and/or background pixels and other noise. They do not indicate the presence of the model object. All matches with very low values are eliminated by applying a low threshold θ. It is clear that this simple thresholding alone is not sufficient, since all models with histogram intersection values above the threshold need not be present in the scene. Several models may have intersection values above the threshold θ for the same or overlapping focus regions. It has to be ensured that the regions associated with different object are disjoint. A winner takes all policy is adopted combined with the removal of detected objects to resolve such conflicts.

A higher histogram intersection value denotes a better match between the region pair (R',M') have the highest intersection value among all the model region pairs. i.e.

$$S(R', M') = \max_{M' \in M, R' \in R} S(R, M)$$

Then M' has the maximum evidence for being present in R' and M' is accepted as the winner. The focus region having the highest histogram intersection value with a model is determined using active search. Active search employs upper bounds on the histogram intersection value for pruning the search area. Consequently, the best matching focus region is determined by evaluating the histogram intersection of a small fraction of the focus regions. The salient aspects of active search are briefly discussed below.

Once a model M' and focus region R' are identified as the winning pair other models are prevented from matching against the same pixels as M'. However, the exact pixels in R' which contributed to the match between model M' and R' are not known. But a large intersection value indicates that most of R' contributed to the match and the winner has a comparatively large intersection value. Therefore, all the pixels of R' are associated with the model M', and the pixels belonging to R' are masked to prevent them from being matched against other models. It may be recalled that any masked pixels are not considered while evaluating the histogram intersection. Consequently, the pixels belonging to R' do not take part in further matches.

The effect of masking pixels belonging to a focus region is schematically shown in FIG. 8B. The region $R_1$ has no pixels in common with the masked region and hence remains unchanged. On the other hand, regions $R_2$ and $R_3$ overlap the masked region and do not constitute the entire square window. Region $R_3$ forms a small narrow region of the input scene and its color distribution will not, in general, constitute a good feature. This effect is not restricted to a given image size but will prevail across all resized images. Also, several focus regions belonging to other resized images may also get modified as a result of masking a region. Some of these focus regions may end up having only a few unmasked pixels. Such regions also do not provide a good feature for matching. Hence all focus regions with a fraction of unmasked pixels less than some constants β<1 are not considered in later match and prune steps. The pruned set of competing regions $R'_c$ becomes FIG. 8C:

$$R_c'=R_c-\{R^k_{ij} \text{ such that fraction of unmarked pixels in } R^k_{ij}>\beta\} \quad (2)$$

It may be noted that since at least the region R' is removed from the set of competing focus regions, the set of competing focus regions strictly decreases after every match and prune step.

The set of models competing for a match are pruned based on the following observations. Consider a model $M_n$ which is not the current winner. The histogram intersection of this model with any focus region can increase only due to masking. From equation (2) it follows that the maximum fraction of pixels in a competing focus region which may be masked is (1-β). Consider a focus region $R_{ij}^k$ having histogram intersection $S(R_{ij}^k,M_n)$. The maximum increase in $S(R_{ij}^k,M_n)$ due to masking will be when the masked pixels do not contribute to the histogram intersection. That is, when the total number of pixels which contribute to the histogram intersection remain the same as a result of masking. Using the upper bound derived below in relation to active search, the maximum histogram intersection value of model $M_n$ in later steps is bounded by $$\frac{1}{\beta} \max_{R^k_{ij}, R_n} S(R^k_{ij}, M_n)$$

Any model for which the above value is less than the threshold q will not become the winner in a later step. Therefore, the set of competing models are pruned as follows:

$$M_c' = M_c - \{M_c, \in M_o \text{ and } \max_{R^k_{ij} \in R_i} S(R^k_{ij} M_i < \beta\theta) \quad (3)$$

In each match the prune step one region is associated with a model and the set of focused regions as well as the set of competing models are pruned. If the pruned set of focus regions $R'_c$ and the models pruned set of competing in $M'_c$. By this process, eventually the set of competing focus regions and/or the set of competing models will become empty. Then, the iterative process of matching and pruning terminates with a set of regions associated with those models which had emerged as winners in some match and prune step.

Active Search

A brief discussion of active search is given. For the sake of brevity the discussions considering a single model are presented. It is clear that neighboring focus regions in an image will have similar color histograms. Active search exploits this fact for concentrating its efforts only on focus regions having high histogram intersection with the model. The search space is pruned using upper bounds on the histogram intersection measure. By this the computational effort is greatly reduced while still retaining the optimality. The upper bound for histogram intersection is derived as follows.

Result. For any two focus regions A and B such that $|A| \geq |B|$ and any model M.

$$S(B, M) \leq \frac{\min(|A \cap B|, S(A, M)|A|) + |B - A|}{|B|}$$

where $|A|$, $|B|$, $|A \cap B|$, and $|B-A|$ respectively, denote the number of pixels in A, pixels in B, pixels common to A and B and pixels in B but not in A.

Proof, let $h^M$, $h^A$ and $h^B$ denote the normalised histograms of the model and the regions A and B. Let $H^A$ and $H^B$ denote the unnormalised histograms of A and B. Then $$S(B, M) \leq = \sum_i \min(h_i^M, h_i^B) = \frac{\sum_i \min(|B|h_i^M, H_i^B)}{|B|}$$

Now, $H^B = (A \cap B)_i + (B-A)_i$, where $(A \cap B)_i$ and $(B-A)_i$, denote the number of pixels mapping to histogram cell i from the regions A B and B−A respectively. In this case $$|B|S(B, M) = \sum_i (|B|h_i^M, (A \cap B)_i + (B-A)_i)$$

$$\leq \sum_i (|B|h_i^M, (A \cap B)_i) + \sum_i (B-A)_i$$

$$\leq \sum_i (|A|h_i^M, (A \cap B)_i) + |B - A|$$

Now $\Sigma_i(|A|h_i^M,(A \cap B)_i) \leq \Sigma_i(|A|h_i^M, A_i) = |A|S(A,M)$ and $\Sigma_i(|A|h_i^M,(A \cap B)_i) \leq \Sigma_i(A \cap B)_i = |A \cap B|$ Therefore we obtain, $$S(B, M) \leq \frac{\min(S(A, M)|A|, |A \cap B|) + |B - A|}{|B|}$$

Based on the above result an upper bound $S(B,M)$ of $S(B,M)$ can be computed as $$S(B, M) = \frac{\min(|A \cap B|, S(A, M)|A|) + |B - A|}{|B|}$$

In general the focus regions A and B may belong to different image sizes. Then the projection of the focus regions on the original image is used for estimating the upper bound. Let $A'$ and $B'$ denote the projection of A and B, respectively, on the original image. Ignoring the sampling effects the following is obtained:

$$S(B, M) \leq \frac{\min(|A' \cap B'|, S(A, M)|A'|) + |B' - A'|}{|B'|}$$

After the histogram intersection of a focus region against the model is evaluated, the upper bounds on the histogram intersection of neighboring focus regions are estimated using equation (4). Since a given focus regions falls in the neighborhood of many other regions, several upper bound estimates are obtained for a focus region. The histogram intersection of a focus region is actually evaluated only if the least among these upper bound estimates is higher than the threshold and the current best match. The active algorithm for determining the focus region having the highest histogram intersection with a model M is given below.

Algorithm Active Search

1. Set $\theta'=\theta_o$, and lub $(R_{ij}^k,M)=1.0$ for all $R_{ij}^k \in R$.
2. Get the next focus region $R_{ij}^k$. If lub $(R_{ij}^k,M)<\theta'$ then set $S(R_{ij}^k,M)=0$ and go to step 5.
3. Compute $S(R_{ij}^k,M)$ using algorithm Evaluate. Set $\theta'=\max (S(R_{ij}^k),\theta')$
4. Compute $S(R_{uv}^p,M)$ for $R_{uv}^p$ in the neighborhood of $R_{ij}^k$ using equation (4) Set lub$(R_{uv}^p,M)=\min$ (lub $(R_{uv}^p,M)$, $S(R_{uv}^p,M))$
5. If more focus regions are remaining go to step 2.
6. $R_{uv}^p$ such that $S(R_{uv}^p,M)=\max S(R_{ij}^k,M)$ is the focus region with highest histogram intersection value, if $S(R_{uv}^p,M)>\theta$. If no focus region has histogram intersection with M higher than the threshold $\theta$.

In algorithm active search, when there are several models, the upper bounds for each model $M_n$ are separately maintained. Also, after one focus region is associated with a model, some pixels in the competing focus regions may be masked. In such cases the number of pixels which are marked in the respective projected regions are to be subtracted from $|A'|,|B'|,|A' \cap B'|$ and $|B'-A'|$ before applying equation (4).

The focused color intersection with active search method may be specified as follows:

Algorithm Focused Colour Intersection

1. Set $M_c=M$ and $R_c=R$ where R is defined by equation (1) and M is the set of models.
2. For each model $M \in M_c$ determine the best matching focus regions $R^M$ using algorithm Active Search.
3. Let $S(R^M,M)=\max S(R^M,M)$. associate region $R^M$ with model M.
4. Mask all pixels belonging to focus regions $R^M$. Modify all focus regions accordingly.
5. Evaluate the pruned set of focus regions $R'_c$ and the pruned set of models $M'_c$ following equations (2) and (3) respectively.
6. If $M'_c$ or $R'_c$ is empty then terminate.
7. Set $M_c=M'_c$ $R_c=R'_c$ and go to step 2.

In the above described method, objects are not available, each key frame 56 can be divided into different parts to approximate the objects.

The direction and magnitude of average motion (u,v) for each frame is calculated, by averaging of the direction and magnitude of motion $(u_i,v_i)$ of all the objects. This allows the "Activity" in frame-to be calculated as follows:

$$\text{Activity of frame} = \sum_{i=1}^{k} \sqrt{[u_i - u]^2 + [v_i - u]^2}$$

Alternatively the standard deviation of the direction and magnitude of motion $(u_i, v_i)$ for the objects in the frame can be used as the activity of the frame. These steps are repeated for each of the frames within each segment 54.

The significance measure of each segment 54 is calculated in step 402 by calculating the average of the activity values of all the frames in the segment 54. The significance measure is thus based on the variation or randomness of local motion in the frames of the respective segment 54.

The significance measure of each key frame 56 is calculated in step 404 by assigning the activity value of the key frame as its significance measure. In an alternative embodiment, the significance measure of each key frame 56 is calculated in step 404 as the average of the activity values of the surrounding frames. These surrounding frames are defined as including all the frames from a mid-point between the present key frame 56 and the preceding and following key frames.

In some embodiments, it may be desirable to determine significance measures for only the key frames 56, in order to reduce processing time for example.

The significance measure values of the individual frames of the video segments 54 may be displayed in a histogram. This activity value histogram may be used for retrieval and searching. A description of this shot activity histogram is now provided. Shots perceived as "high-action" (high speed car chase, fast moving dance, action sports etc.) have several objects with rapid and random movements. Shots (defined as a sequence of frames $/(t), /(t+1), \ldots /(t+n-1)$ perceived as "low-action" (television anchor shot, stills etc.) have objects with small or no movements. To estimate activity level based on this observation, the objects in a frame and their motion is determined. The object regions in a frame are approximated in two steps: (1) Focused colour intersection to detect known objects. (2) Divide remainder into regions of given shape and size. The object motion is estimated as the region's average optical flow.

Optical flow fields at time t are computed form the following optical flow constraint equations using the multipoint method using a 2×2 neighborhood, as described p Nesi and A DelBimbo, 'A vision system for estimating people flow". In Image Technology, pp. 170–201, Springer-Verlay, 1996, the contents of which are hereby incorporated by reference.

$$\frac{\partial g(x, y, t)}{\partial t} + \frac{\partial g(x, y, t)}{\partial x} + \frac{\partial g(x, y, t)}{\partial y} v = 0,$$

where g(x,y,t) is brightness at (x,y) in frame $/(t)$ and u and v denote the velocity components along x and y. Let u(t,i), v(t,i) denote the flow averaged over $i^{th}$ region R(t,i). Let u(t) and v(t) denote the flow averaged over the entire frame $/(t)$. Then activity level A(t) is $$A(t) = \sum_{i=1}^{i=k} \sqrt{[u(t, i) - u(t)]^2 + [v(t, i) - v(t)]^2}$$

Since 3 frames are used for optical flow estimation, n−2 activity level values are obtained for a hot with n frames.

Let A(t), A(t+1), ..., A(t+n−3) denote the n−2 activity values obtained for a shot with n frames. A shot activity histogram is defined as the normalised histogram of A(t) values of that shot. Let $A_{min}$ and $A_{max}$ denote the minimum and maximum values of A(t). Let H denote the shot activity histogram with b bins and H(i) denote the value at $i^{th}$ bin. Then H(i) is computed in two steps:

1. H(i)=number of A(t) values between i $$(i+1)\frac{(A_{max} - A_{min})}{b} \cdot 2 \cdot H(i) = \frac{H(i)}{\sum_{j=0}^{b-1}} 0 \le i < b$$

Example based retrieval may be done using histogram similarity given a shot or shot activity histogram. The shot activity histogram is often sparse resulting in large quantisation errors. In order to reduce this effect smoothed histograms are used. As nearby bins denote perceptually nearby activity levels, smoothing has on adverse effects. Let $\hat{H}_A$ and $\hat{H}_B$ denote the smoothed histograms. The similarity S(A,B) of shots A and B is evaluated as $$S(A, B) = \sum_{i=1}^{i=b-2} \min(\hat{H}_A(i), \hat{H}_B(i))$$

For ranking shots based on its level of action, the shot activity level is defined as the mean value of the shot's activity levels.

What is claimed is:

1. A method for converting full motion video into a slide show with synchronized audio, said method comprising the steps of:
   (a) receiving audio-video data;
   (b) separating said audio-video data into an audio stream and a video sequence;
   (c) dividing said video sequence into video segments, each of said video segments comprising a group of frames;
   (d) for each of said video segments
      (d1) extracting at least one representative frame from the corresponding said group of frames;
      (d2) calculating a significance measure using said at least one representative frame;
      (d3) using said significance measure, selecting at least one slide frame from said group of frames;
   (e) synchronizing said audio stream and said at least one slide frame; and
   (f) synchronously reproducing said at least one slide frame and said audio stream.

2. A method according to claim 1 wherein stop (c) comprises dividing said video sequence into video segments by detecting scene changes in said video sequence.

3. A method according to claim 1 wherein step (d2) comprises calculating a (first) significance measure for each frame.

4. A method according to claim 3 wherein step (d2) further comprises calculating a second significance measure for said video segment using said first significance measures.

5. A method according to claim 4 wherein said second significance measure is used to determine a number of said frames to be selected as slide frames for said video segment.

6. A method according to claim 5 wherein said number of frames is determined by applying one of a logistic function or a mono-tonically increasing function to said second significance measures.

7. A method according to claim 4 wherein step (d2) further comprises calculating a third significance measure for said representative frames using said first significance measures.

8. A method according to claim 7 wherein step (d3) selects said slide frames using said third significance measures.

9. A method according to claim 7 wherein said third significance measure of each of said representative frames are a function of said first significance measure of said frames surrounding said representative frame.

10. A method according to claim 9 further comprising the step, after step (e1) and before step (e), of:
(e2) retrieving said audio stream and said slide frames from said storage means.

11. A method according to claim 7 wherein said third significance measures of each of said representative frames are said first significance measures of sad representative frames.

12. A method according to claim 3 wherein step (d3) selects at least one said slide frame using said first significance measures.

13. A method according to claim 3 wherein step (d3) selects a predetered number of said slide frames using said fire significance measures.

14. A method according to claim 3 wherein said first significance measures are determined from a level of relative movement between said frames.

15. A method according to claim 14 wherein said frames comprise objects and said level of relative movement is determined from a direction and magnitude of motion (ui, vi) of each object in said frames to derive an activity value of the frame.

16. A method according to claim 15 wherein said activity value is determined from the standard deviation of the direction and magnitude of motion (ui, vi) of each object.

17. A method according to claim 15 wherein said activity value is determined according to the expression:

$$Activity = \sum_{i=1}^{k} \sqrt{[u_i - u]^2 + [v_i - u]^2}$$

wherein (u,v) is the average direction and magnitude of motion of all objects in said frame.

18. A method according to claim 15 wherein said first significance measures of each of said frames are the activity values of said frames.

19. A method according to claim 15 wherein said second significance measure for each said segment is determined by averaging the activity values of said frames.

20. A method according to claim 3 wherein step (d3) is performed by selecting the slide frames such that said slide frames are substantially equally spaced in time.

21. A method according to claim 1, further comprising the step, before step (e) of:
(e1) storing said audio stream and said slide frames on a storage means for later retrieval.

22. A method according to claim 1, wherein step (e) is performed by determining a frame number of the slide frame to be shown from a time identifier retrieved from said audio stream.

23. A method according to claim 1, further comprising the step, after step (e) and before step (f), of:
(f1) receiving an user request to change a criteria for selecting said slide frames and in response thereto, using said significance measure, select for each said video segment at least one substitute slide frame from said group of frames; and
(f2) synchronising said audio stream and said slide frames.

24. A method for creating a database for use in converting full motion video into a slide show with synchronized audio, said method comprising the steps of:
(a) receiving audio-video data;
(b) separating said audio-video data into an audio stream and a video sequence;
(c) dividing said video sequence into video segments, each of said video segments comprising a group of frames;
(d) for each of said video segments
(d1) extracting at least one representative frame from the corresponding said group of frames;
(d2) calculating a significance measure using said at least one representative frame;
(d3) selecting at least one slide frame from said group of frames using said significance measures; and
(e) storing at least an identifier to each of said segments, said significance measure and an identifier to said audio stream.

25. A method according to claim 24, the method comprises the further step of storing an identifier to said extracted representative frames.

26. A method for displaying a slide show with synchronized audio, said method comprising the steps of:
(a) retrieving at least an identifier to each of a plurality of video segments, significance measures and an identifier to an audio stream, wherein each of said video segments comprising a group of frames;
(b) for each of said video segments
(b1) extracting at least one representative frame from the corresponding said group of frames;
(b2) calculating a significance measure using said at least one representative frame;
(b3) using said significance measure, selecting at least one slide frame from said group of frames;
(c) synchronizing said audio stream and said slide frame; and
(d) synchronously reproducing said slide frame and said audio stream.

27. Apparatus for creating a database for use in converting full motion video into a slide show with synchronized audio, said apparatus comprising:
input means for receiving audio-video data;
audio extraction means for separating said audio-video data into an audio stream and a video sequence;
video dividing means for dividing said video sequence into video segments, each of said video segments comprising a group of frames;
key frame extraction means for extracting, for each of said video segments at least one representative frame from the corresponding said group of frames of each of said video segments;
significance calculation means for calculating significance measures using said at least one representative frame;
selection means for selecting at least one slide frame from said group of frames using said significance measures; and
database storage means for storing said database, the database including at least an identifier to each of said segments, said significance measures and an identifier to said audio stream.

28. Apparatus for displaying a slide show with synchronized audio, said apparatus comprising:
    database retrieval means for retrieving a database, the database including at least an identifier to each of a plurality of video segments, significance measures and an identifier to an audio stream, wherein each of said video segments comprising a group of frames;
    extracting means for extracting at least one representative frame from the corresponding said group of frames;
    calculating means for calculating a significance measure using said at least one representative frame;
    selection means for selecting, for each of said video segments, at least one slide frame from said group of frames using said significance measure; and
    synchronization means for synchronising said audio stream and said at least one slide frame; and
    output means for synchronously reproducing said at least one slide frame and said audio stream.

29. Apparatus according to clam 28, said apparatus further comprising:
    presentation storage means for storing said audio stream and said slide frames for later retrieval.

30. Apparatus for presenting a slide show with synchronized audio, said apparatus comprising:
    presentation retrieval means for retrieving from a storage means at least an identifier to each of a plurality of video segments, significance measures and an identifier to an audio stream, wherein each of said video segments comprising a group of frames;
    extracting means for extracting at least one representative frame from the corresponding said group of frames;
    calculating means for calculating a significance measure using said at least one representative frame;
    selection means for selecting, for each of said video segments, at least one slide frame from said group of frames using said significance measure; and
    synchronization means for synchronising said audio stream and said at least one slide frame; and output means for synchronously reproducing said at least one slide frame and said audio stream.

31. Apparatus according to claim 28, wherein said database is retrieved from a network.

32. A computer program product including a computer readable medium incorporating a computer program for creating a database for use in converting full motion video into a slide show with synchronized audio, said computer program product comprising:
    input means for receiving audio-video data;
    audio extraction means for separating said audio-video data into an audio stream and a video sequence;
    video dividing means for dividing said video sequence into video segments, each of said video segments comprising a group of frames;
    key frame extraction means for extracting, for each of said video segments, at least one representative frame from the corresponding said group of frames of each of said video segments;
    significance calculation means for calculating significance measures using said at least one representative frame;
    selection means for selecting at least one slide frame from said group of frames using said significance measures; and
    database storage means for storing said database, the database including at least an identifier to each of said segments, said significance measures and an identifier to said audio stream.

33. A computer program product including a computer readable medium incorporating a computer program for creating a database for displaying a slide show with synchronized audio, said computer program product comprising:
    database retrieval means for retrieving a database, the database including at least an identifier to each of a plurality of video segments, significance measures and an identifier to an audio stream, wherein each of said video segments comprising a group of frames;
    extracting means for extracting at least one representative frame from the corresponding said group of frames;
    calculating means for calculating a significance measure using said at least one representative frame;
    selection means for selecting, for each of said video segments, at least one slide frame from said group of frames using said significance measurer; and
    synchronization means for synchronising said audio stream and said at least one slide frame; and
    output means for synchronously reproducing said at least one slide frame and said audio stream.

34. A computer program product including a computer readable medium incorporating a computer program for creating a database for converting full motion video into a slide show with synchronized audio, said computer program product comprising:
    means for receiving audio-video data;
    means for separating said audio-video data into an audio stream and a video sequence;
    means for dividing said video sequence into video segments, each of said video segments comprising a group of frames;
    means for processing each said video segments by
       (1) extracting at least one representative frame from the corresponding said group of frames;
       (2) calculating a significance measure using said at least one representative frame;
       (3) using said significance measure, selecting at least one slide frame from said group of frames;
    means for synchronising said audio stream and said at least one slide frame; and
    means for synchronously reproducing said at least one slide frame and said audio stream.

35. A computer program product including a computer readable medium incorporating a computer program for creating a database for use in converting full motion video into a slide show with synchronized audio, said computer program product comprising:
    means for receiving audio-video data;
    means for separating said audio-video data into an audio stream and a video sequence;
    means for dividing said video sequence into video segments, each of said video segments comprising a group of frames;
    means for processing each of said video segments by
       (1) extracting at least one representative frame from the corresponding said group of frames;
       (2) calculating a significance measure using said at least one representative frame;
       (3) selecting at least one slide frame from said group of frames using said significance measure; and means for storing at least an identifier to each of said segments, said significance measure and an identifier to said audio stream.

36. A computer program product including a computer readable medium incorporating a computer program for displaying a slide show with synchronized audio, said computer program product comprising:

means for retrieving at least an identifier to each of a plurality of video segments, significance measures and an identifier to an audio stream, wherein each of said video segments comprising a group of frames;

means for processing each of said video segments by
  (1) extracting at least one representative frame from the corresponding said group of frames;
  (2) calculating a significance measure using said at least one representative frame;
  (3) using said significance measurer, selecting at least one slide frame from said group of frames;

means for synchronising said audio stream and said at least one slide frame; and means for synchronously reproducing said at least one slide frame and said audio stream.

37. A method for converting full motion video into a slide show with synchronized audio, said method comprising the steps of:

(a) receiving audio-video data;

(b) separating said audio-video data into an audio stream and a video sequence;

(c) dividing said video sequence into video segments, each of said video segments comprising a group of frames;

(d) for each of said video segments
  (d1) extracting at least one representative frame from the corresponding said group of frames;
  (d2) calculating a first significance measure using said at least one representative frame, and calculating a second significance measure for said video segment using said first significance measures;
  (d3) using said significance measure, selecting at least one slide frame from said group of frames;

(e) synchronizing said audio stream and said at least one slide frame;

(f) synchronously reproducing said at least one slide frame and said audio stream;

(g) wherein said second significance measure is used to determine a number of said at least one slide frame to be selected as slide frames for said video segment.

38. A method according to claim 37 wherein step (d2) further comprises calculating a third significance measure for said representative frames using said first significance measures.

39. A method according to claim 37 wherein said number of frames is determined by applying one of a logistic function or a mono-tonically increasing function to said second significance measures.

40. A computer program product including a computer readable medium incorporating a computer program for creating a database for use in converting full motion video into a slide show with synchronized audio, said computer program product comprising:

input means for receiving audio-video data;

audio extraction means for separating said audio-video data into an audio stream and a video sequence;

video dividing means for dividing said video sequence into video segments, each of said video segments comprising a group of frames;

key frame extraction means for extracting, for each of said video segments, at least one representative frame from the corresponding group of frames of each of said video segments;

significance calculation means for calculating a first significance measure using said at least one representative frame, and for calculating a second significance measure for said video segment using said first significance measure, and using said significance measures to select at least one slide frame from said group of frames and database storage means for storing said database, the database including at least an identifier to each of said segments, said significance measures and an identifier to said audio stream.

41. A computer program product including a computer readable medium incorporating a computer program for converting full motion video into a slide show with synchronized audio, said computer program product comprising:

means for receiving audio-video data;

means for separating said audio-video data into an audio stream and a video sequence;

means for dividing said video sequence into video segments, each of said video segments comprising a group of frames;

means for processing each of said video segments by
  (1) extracting at least one representative frame from the corresponding said group of frames;
  (2) calculating a first significance measure using said at least one representative frame, and calculating a second significance measure for said video segment using said first significance measure;
  (3) using said significance measures, selecting at least one slide frame from said group of frames;

means for synchronising said audio stream and said at least one slide frame;

means for synchronously reproducing said at least one slide frame and said audio stream; and wherein said second significance measure is used to determine a number of said at least one slide frames to be selected as slide frames for said video segment.

* * * * *